United States Patent
Berthelot et al.

(10) Patent No.: US 12,326,797 B2
(45) Date of Patent: *Jun. 10, 2025

(54) METHODS AND APPARATUS TO COLLECT MEDIA METRICS ON COMPUTING DEVICES

(71) Applicant: The Nielsen Company (US), LLC, New York, NY (US)

(72) Inventors: Travis Berthelot, Lewisville, TX (US); Sanjeev Kumar Viswambharan, Frisco, TX (US); Pararth Mehta, Mumbai (IN); Pankaj Bengani, Mumbai (IN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,259

(22) Filed: Jan. 8, 2024

(65) Prior Publication Data

US 2024/0195881 A1 Jun. 13, 2024

Related U.S. Application Data

(63) Continuation of application No. 17/401,124, filed on Aug. 12, 2021, now Pat. No. 11,895,203, which is a (Continued)

(30) Foreign Application Priority Data

Feb. 12, 2019 (IN) .............................. 201911005508

(51) Int. Cl.
*G06F 15/16* (2006.01)
*G06F 9/54* (2006.01)
(Continued)

(52) U.S. Cl.
CPC .......... *G06F 11/3466* (2013.01); *G06F 11/34* (2013.01); *H04L 43/08* (2013.01); *H04L 67/14* (2013.01); *H04L 67/535* (2022.05)

(58) Field of Classification Search
CPC .......... G06F 11/34; H04L 67/14; H04L 43/08; H04L 67/22; H04L 47/2416; H04L 47/801
(Continued)

(56) References Cited

U.S. PATENT DOCUMENTS

9,503,536 B2 * 11/2016 Bosworth ............... G06F 11/34
9,900,264 B1 * 2/2018 Chen ................... G06Q 30/0283
(Continued)

*Primary Examiner* — Hamza N Algibhah (57) ABSTRACT

Methods, apparatus, systems and articles of manufacture are disclosed that collect media metrics on computing devices. An example apparatus includes at least one memory, instructions in the apparatus, and processor circuitry to execute the instructions to determine a permission level of a meter and, in response to the determination, request a permission to access media data of an application programming interface (API), in response to determining a media session notification is available as indicated by the API, package media session data associated with the media session notification, the media session data extracted from metadata of the media session notification, obtain foreground information; and generate a package of metrics, the package of metrics including the packaged media session data and the foreground information.

20 Claims, 6 Drawing Sheets

Related U.S. Application Data continuation of application No. 16/368,217, filed on Mar. 28, 2019, now Pat. No. 11,122,134.

(51) Int. Cl.
　　*G06F 11/34*　　(2006.01)
　　*H04L 29/06*　　(2006.01)
　　*H04L 43/08*　　(2022.01)
　　*H04L 67/14*　　(2022.01)
　　*H04L 67/50*　　(2022.01)

(58) Field of Classification Search
　　USPC ........................................................ 709/224
　　See application file for complete search history.

(56) References Cited

U.S. PATENT DOCUMENTS

| | | | |
|---|---|---|---|
| 9,942,584 B2* | 4/2018 | Wright | H04N 21/44224 |
| 11,895,203 B2* | 2/2024 | Berthelot | H04L 43/08 |
| 2005/0181722 A1* | 8/2005 | Kopra | H04H 60/07 |
| | | | 455/2.01 |
| 2007/0174877 A1* | 7/2007 | Papillon | G06Q 30/02 |
| | | | 725/62 |
| 2008/0109295 A1* | 5/2008 | McConochie | A61B 3/14 |
| | | | 709/224 |
| 2008/0126420 A1* | 5/2008 | Wright | H04N 21/42684 |
| | | | 348/E7.071 |
| 2009/0171767 A1* | 7/2009 | Kolessar | G06Q 10/10 |
| | | | 705/7.32 |
| 2010/0076998 A1* | 3/2010 | Podgorny | G06Q 10/10 |
| | | | 707/772 |
| 2016/0360004 A1* | 12/2016 | Lue-Sang | G06F 9/54 |
| 2019/0129938 A1* | 5/2019 | Yao | H04L 12/282 |
| 2019/0230010 A1* | 7/2019 | Guo | H04L 43/0894 |
| 2019/0251165 A1* | 8/2019 | Bachrach | G06N 3/084 |

\* cited by examiner

METHODS AND APPARATUS TO COLLECT MEDIA METRICS ON COMPUTING DEVICES

CROSS-REFERENCE TO RELATED APPLICATIONS

This patent application is a continuation of U.S. patent application Ser. No. 17/401,124, filed Aug. 12, 2021, which issued as U.S. Pat. No. 11,895,203, and which is a continuation of U.S. patent application Ser. No. 16/368,217, filed Mar. 28, 2019, which issued as U.S. Pat. No. 11,122,134, and which claims the benefit of and priority to Indian Provisional Patent Application Ser. No. 201911005508, filed Feb. 12, 2019, each of which are hereby incorporated by reference herein in their respective entireties.

FIELD OF THE DISCLOSURE

This disclosure relates generally to media monitoring data, and, more particularly, to methods and apparatus to collect media metrics on computing devices.

BACKGROUND

Various On Device Meters (ODM) have been used by audience measurement entities to collect data about media consumed on computing device. However, the restrictions imposed by operating systems of mobile devices (e.g., smartphones) limit the ability of ODMs to collect information. Further, there is increased interest in what users are doing within the apps (e.g., videos being watched on YouTube or Netflix, products being purchased on Amazon or songs being listened to).

BRIEF DESCRIPTION OF THE DRAWINGS

The figures are not to scale. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for case of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for case of referencing multiple elements or components.

DETAILED DESCRIPTION

To obtain monitoring data (e.g., user information, user actions, duration spent performing an action) from an electronic device (e.g., a cellphone, personal laptop, personal computer, tablet, or smart watch), a meter may collect and store data (e.g., user information, user actions, duration spent performing an action). Typically, these meters are installed in the form of a downloadable application.

Prior approaches to obtaining user data via a meter installed on an electronic device include utilizing application usage data, web traffic through a local virtual private network (VPN), device meters (e.g., central processing unit (CPU) meter, battery meters, etc.) and/or radio measurement. In such prior approaches, streamed media content to the user device is unattainable. For example, content information for streamed media over Netflix™ or Hulu™ cannot be easily captured.

Examples disclosed herein utilize a combination of native Android™ application programming interfaces (APIs) to access information about media content being played, the application playing the media, and the actions taken (e.g., start, stop, pause, etc.). Example native Android™ APIs include a notification API (e.g., Android™ NotificationListenerService), a media API (e.g., Android™ MediaSession), and an audio API (e.g., Android™ AudioManager).

Examples disclosed herein include determining a permission level of the meter. In examples disclosed herein, an additional permission request is transmitted to the user. In such examples, the additional permission (e.g., notification permission) grants the meter access to the data and content generated by native Android™ APIs. Such example permission provides access to monitoring and storing media consumption on Android™ devices using Android™ native application programming interfaces (APIs).

Examples disclosed herein include utilizing the meter to obtain foreground application information and/or metrics. Such foreground application information and/or metrics include current application playing, last application playing, current time, etc. In examples disclosed herein, data obtained from native Android™ APIs is parsed with the foreground application information and/or metrics to determine similarities. For example, if the foreground application information and/or metrics provides information pertaining to the title of a video and, in parallel, data obtaining from native Android™ APIs includes a start time, a package can be created including the start time of a particular video.

The example meter implemented according to the disclosure may provide history for users as a service. In such an example, users may observe media history across multiple applications. Additionally, the meter may log and/or otherwise record events performed by the user on the user device. Examples disclosed herein include accessing the meter on a user device to determine an action performed on the user device.

Examples disclosed herein allow the end user to obtain the meter by signing up on a third-party site (e.g., place of business or online website) and having the example meter sent to them virtually or physically, downloading the meter via a virtual app or physical memory storage device, or downloading a program via a virtual app or physical memory storage device in which the program described above contains the meter.

Figure 1:
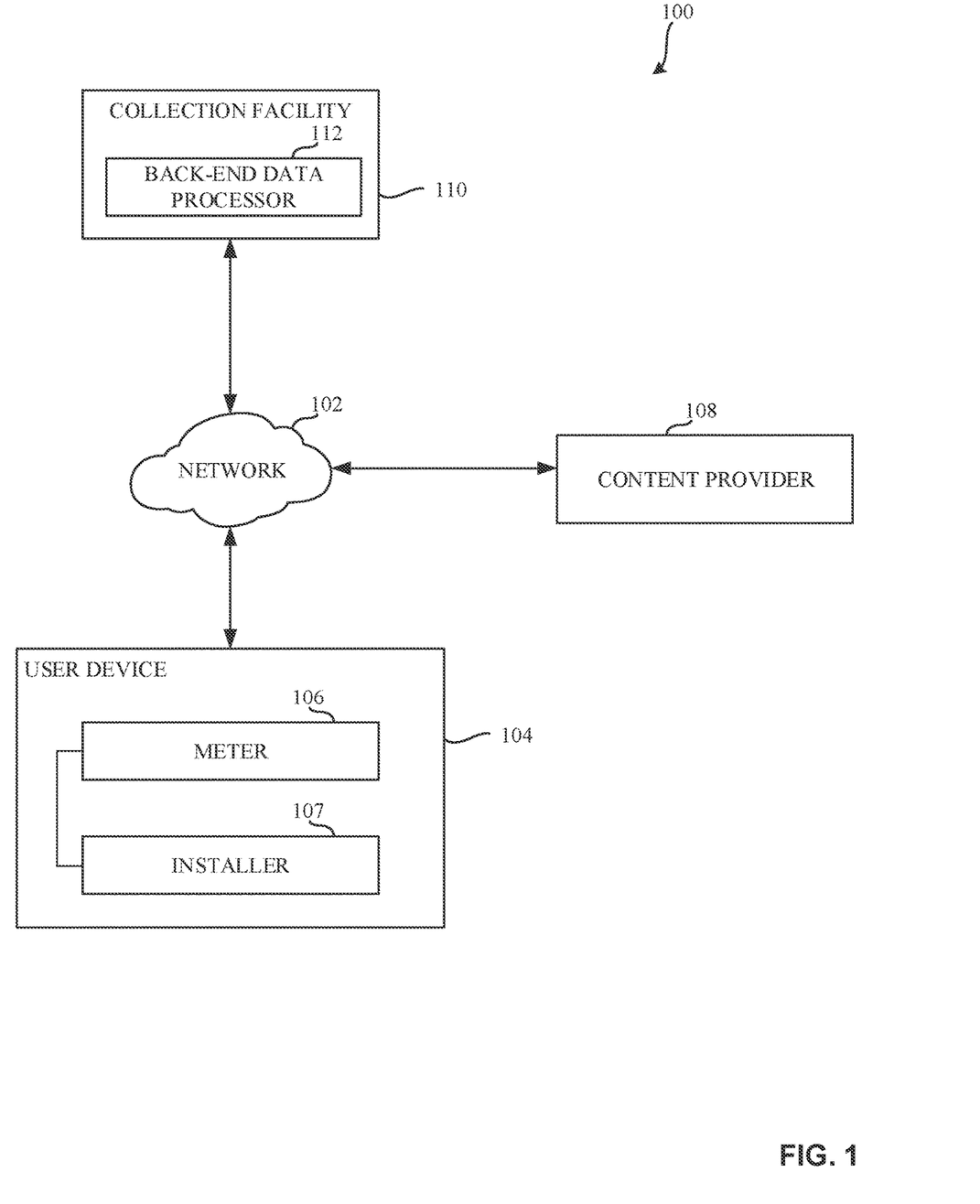
FIG. 1 is a block diagram illustrating an example flow of information between the collection facility, content provider, and user device within the network.

Examples disclosed herein include a group of panelists in which the panelists in the group are the users of the user device. These panelists are selected voluntarily or involuntarily. Alternatively, the group of panelists may include a non-human group FIG. 1 is a block diagram 100 illustrating an example flow of information between the collection facility 110, content provider 108, and user device 104 within the network 102. The example meter 106 transmits the audience measurement data (e.g., event data) to an example collection facility 110. The collection facility 110, content provider 108, and user device 104 communicate to each other via the network 102. The meter 106, as disclosed, is contained in the user device 104 (e.g., in the form of an application). According to the illustrated example, the meter 106 collects data (e.g., event data) about the operation of the applications on the user device 104 using the Accessibility Service.

In the illustrated example of FIG. 1, the example network 102 is a communications network. The example network 102 allows the user device 104, the content provider 108, and the example collection facility 110 to interface with each other to provide audience measurement data (e.g., event data) via a wired and/or wireless analog and/or digital network communication. Example wired and/or wireless analog and/or digital network communications include Zigbee, microwaves, lasers for wireless, fiber cable, communication cable, satellite communications, quantum teleportation, local area network, wide area network, personal area network, wireless local area network, the Internet, a cloud, or any other type of wired and/or wireless analog and/or digital communications network.

In the illustrated example of FIG. 1, the example user device 104 is a computing device which enables a user to connect to an example network 102 and perform actions on applications within the user device 104. The user device 104 may include, but not limited to, a cellular phone, portable tablet, personal computer, laptop, smart watch, or gaming consoles. The example user device 104 may contain downloadable content in which the user may interact with. This data (e.g., event data) may be accessible by the meter 106 installed on the device.

In the illustrated example of FIG. 1, the example meter 106 may be in the form of a downloadable application. For example, the application may be downloaded onto the user device 104 by the device owner (e.g., the individual who is accessing content from the content provider 108 on the user device 104) from an application store (e.g., App Store®, Google Play™, etc.). Additionally, the example meter 106 may be downloaded onto the user device 104 through the metering authority (one who is initiating the metering). For example, a user may log onto the metering authority's website and downloading from the metering authority servers. Alternatively, the meter may be downloaded via sideloading, such as USB, Wi-Fi, etc. The example meter 106 is accessible by the collection facility 110 via the network 102. The example meter 106 measures data (e.g., event data) on the user device 104. The data (e.g., event data) may be in the form of, but not limited to, video watched, name of video, genre, time spent on video, product viewed, or product searched for.

In the illustrated example of FIG. 1, the example installer 107 is communicatively coupled to the meter 106. In examples disclosed herein, if the meter 106 is not installed on the user device 104, the installer 107 can facilitate the installation of the meter 106. Additionally, the installer 107 determines if the meter 106 is installed on the user device 104. If the installer 107 determines the meter 106 is not installed on the user device 104, the installer 107 generates a request to the user device 104 to install the meter 106. Additionally or alternatively, the installer 107 may install the meter 106 in response to a command originating by the user of the user device 104. For example, in response to a command originating on the user device (e.g., a command from a user), the installer 107 obtains the meter 106 (e.g., from the user device 104 or the collection facility 110 via the network 102) and executes instructions to install the meter 106 on the user device 104. In other examples disclosed herein, the installer 107 may be implemented outside the user device 104.

In the illustrated example of FIG. 1, the example content provider 108 is a third-party content host which provides content (e.g., movies, songs, or news articles) to the user device 104 via the network 102. The content provider 108 may generate, provide, or facilitate content on the user device 104. Example content providers may include Netflix™, Hulu™, The Washington Post™, or Spotify™. The content provider 108 may provide content to the user device 104 directly through a wired connection.

In the illustrated example of FIG. 1, the example collection facility 110 collects and manages event data from the user device 104. The event data from the example collection facility 110 is then manipulated, organized, or sorted into measurable figures.

Figure 2:
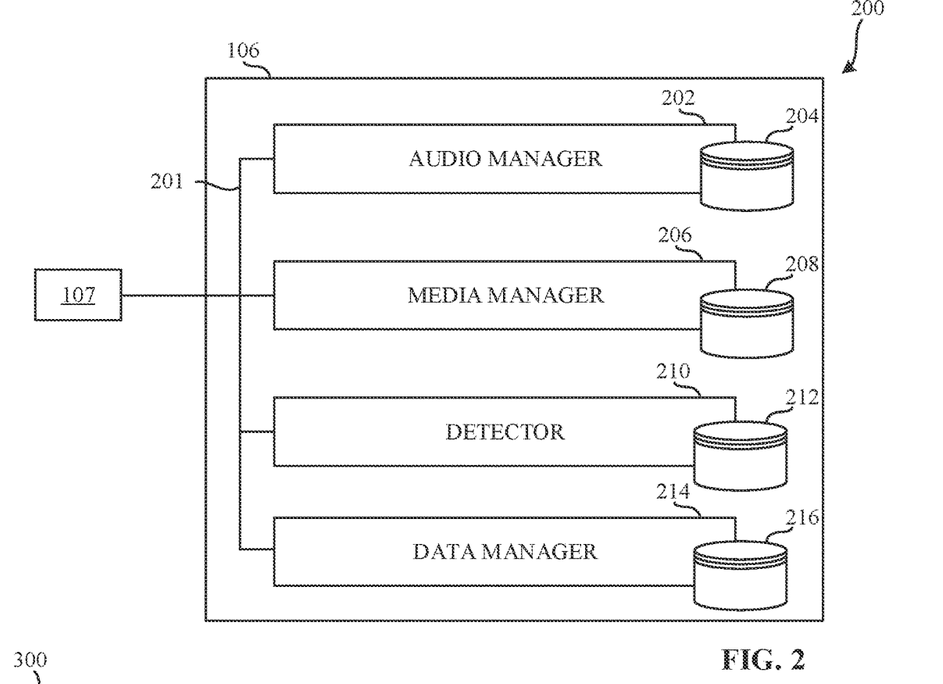
FIG. 2 is an example block diagram of the example meter of FIG. 1 to collect and analyze media session data.

FIG. 2 is an example block diagram 200 of the example meter 106 of FIG. 1 to collect and analyze media session data. In the illustrated example of FIG. 2, the meter 106 includes an example audio manager 202, an example media manager 206, an example detector 210, and an example data manager 214. The audio manager 202, the media manager 206, the detector 210, and the data manager 214 communicate via the example communication bus 201.

In the illustrated example of FIG. 2, the communication bus 201 is a hardware conductive communication bus. In other examples disclosed herein, the communication bus 201 may be implemented via wireless communication between the audio manager 202, the media manager 206, the detector 210, and the data manager 214 and/or any other suitable communication bus.

In the illustrated example of FIG. 2, the audio manager 202 obtains data and/or metrics related to audio playing on the user device 104. The audio manager 202 interacts with an audio API (e.g., Android™ AudioManager API) on the user device 104. In examples disclosed herein, audio data and/or metrics refers to state changes relating to audio (e.g., changes in audio gain, changes in audio loss, changes in audio transient) that occur on the user device 104. Additionally, audio data and/or metrics may refer to current audio states on the user device 104 such as mute, full volume, no audio playing, etc. In such examples, the audio manager 202 utilizes the permission granted when installing the meter 106. In other examples, the audio manager 202 may send a request to the detector 210 and/or the installer 107 via the communication bus 201 to obtain a second permission to access data of any suitable Android™ API. The audio manager 202 interacts with the Android™ Audio API (e.g., the AudioManager API) to obtain a notification of an application on the user device 104 playing and/or stopping audio and/or video. In examples disclosed herein, if the audio manager 202 detects a notification from the Android™ Audio API (e.g., the AudioManager API) indicating audio and/or video on the user device 104 has started, then the audio manager 202 records the start time. Additionally, the audio manager 202 can detect a notification from the Android™ Audio API (e.g., the AudioManager API) indicating audio and/or video on the user device 104 has stopped. In such examples, the audio manager 202 records the stop time. Additionally, in such examples, the audio manager 202 can calculate the duration of the audio and package the metrics obtained in response to the audio. The audio manager 202 is coupled to an audio manager database 204.

In the illustrated example of FIG. 2, the audio manager database 204 stores the audio data and/or metrics obtained by the audio manager 202. The audio manager database 204 may be physical memory located in the meter 106. In other examples disclosed herein, the audio manager database 204 represents external storage (e.g., an external hard drive or an external cloud service) and may be accessed wirelessly by the audio manager 202. In examples disclosed herein, the audio manager database 204 is accessed at any time by the audio manager 202 and/or any suitable component in the meter (e.g., the media manger 206, the detector 210, and/or the data manager 214).

In the illustrated example of FIG. 2, the example media manager 206 obtains data and/or metrics from the user device 104. In examples disclosed herein, the media manager 206 obtains a notification permission from the user device 104 to access a notification API (e.g., Android™ NotificationListenerService application programming interface (API)). In other examples disclosed herein, the media manager 206 may obtain a plurality of permissions to access a plurality of APIs on the user device 104 (e.g., Android™ AudioManager API, Android™ MediaSession API, etc.). In such examples, the notification permission obtained from the user device 104 grants permission to the media manager 206 to obtain data and/or metrics (e.g., media session notifications) from a media API (e.g., the Android™ MediaSession API). In response to a user granting the requested notification permission, the media manager 206 listens for media session notifications provided by the notification API (e.g., Android™ NotificationListenerService API). In examples disclosed herein, the notification API (e.g., Android™ NotificationListenerService API) provides media metrics in conjunction with the media API (e.g., Android™ MediaSession API). For example, the media manager 206 may obtain media session data and/or metrics in response to observing a media notification through the notification API (e.g., Android™ NotificationListenerService API). The media manager 206 is explained in further detail below.

In the illustrated example of FIG. 2, the media manager database 208 stores the notification and/or media data and/or metrics obtained by the media manager 206. The media manager database 208 may be physical memory located in the meter 106. In other examples disclosed herein, the media manager database 206 represents external storage (e.g., an external hard drive or an external cloud service) and may be accessed wirelessly by the media manager 206. In examples disclosed herein, the media manager database 208 is accessed at any time by the media manager 206 and/or any suitable component in the meter (e.g., the audio manger 202, the detector 210, and/or the data manager 214).

In the illustrated example of FIG. 2, the detector 210 obtains foreground application metrics on the user device 104 (e.g., current active application, active application use data, etc.). The detector 210 obtains the foreground application metrics using the permission obtained when initially installing the meter 106. For example, when a user designates permission to install the meter 106 on the user device 104, the detector 210 may utilize such permission to obtain application foreground information. In examples disclosed herein, the detector communicates with the audio manager 202 and/or the media manager 206 to obtain respective audio and/or media data and/or metrics.

In the illustrated example of FIG. 2, the example detector database 212 stores the foreground application metrics occurring on the user device 104. Additionally, the detector database 212 may store the notification and/or media data and/or metrics obtained by the audio manager 202 and/or the media manager 206. The detector database 212 may be physical memory located in the meter 106. In other examples disclosed herein, the detector database 212 represents external storage (e.g., an external hard drive or an external cloud service) and may be accessed wirelessly by the detector 210. In examples disclosed herein, the detector database 212 is accessed at any time by the detector 210 and/or any suitable component in the meter (e.g., the audio manger 202, the media manager 206, and/or the data manager 214).

In the illustrated example of FIG. 2, the example data manager 214 communicates with the audio manager 202, the media manager 206, and/or the detector 210 via the communication bus 201 to obtain respective audio data and/or metrics, media data and/or metrics, and/or foreground information. In examples disclosed herein, the data manager 214 parses the obtained audio data and/or metrics, media data and/or metrics, and/or obtained foreground information to create a centralized package of metrics. For example, if the media data and/or metrics is absent of audio information (e.g., the application restricts the media API to release audio metrics), then the data manager 214 combines the similar audio data and/or metrics obtained by the audio manager 202 (e.g., through the audio API) with the media data and/or metrics and/or the foreground information to create a package of audio data and/or metrics. In examples disclosed herein, the package of data and/or metrics is stored in the data manager database 216, accessible by the user device 104.

In the illustrated example of FIG. 2, the example data manager database 216 stores the package data, metrics, and/or information from the data manager 214. The data manager database 216 may be physical memory located in the meter 106. In other examples disclosed herein, the data manager database 216 represents external storage (e.g., an external hard drive or an external cloud service) and may be accessed wirelessly by the data manager 214. In examples disclosed herein, the data manager database 216 is accessed at any time by the data manager 214 and/or any suitable component in the meter (e.g., the audio manger 202, the media manager 206, and/or the detector 210).

Figure 3:
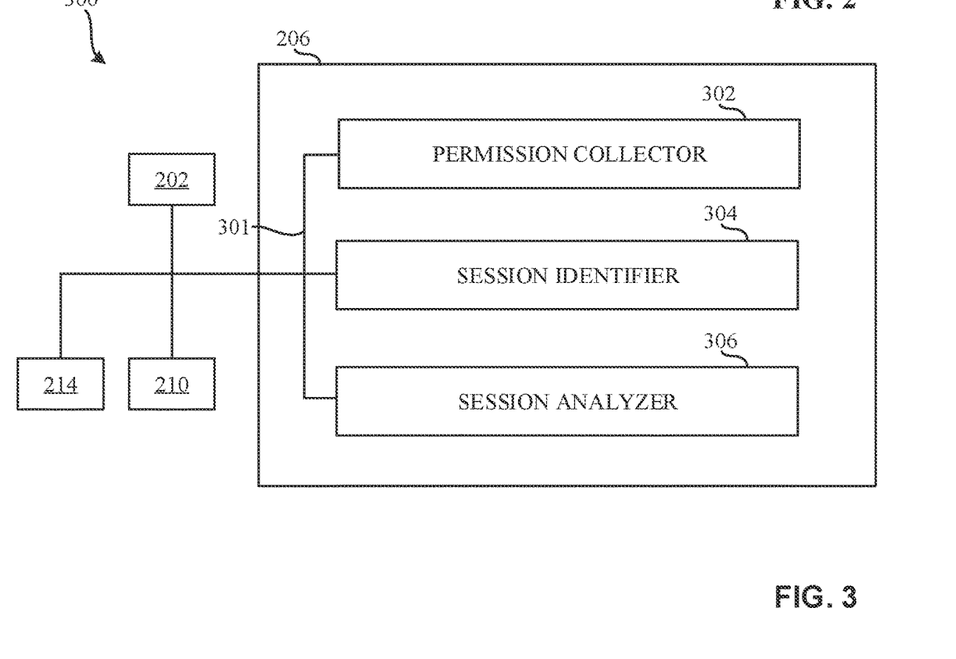
FIG. 3 is an example block diagram of the example media manager of FIG. 2 to identify and analyze session data and/or metrics.

FIG. 3 is an example block diagram 300 of the example media manager 206 of FIG. 2 to identify and analyze session data and/or metrics. The media manager 206 includes an example permission collector 302, an example session identifier 304, and an example session analyzer 306. In the example illustrated in FIG. 3, the permission collector 302, the session identifier 304, and/or the session analyzer communicate via an example media communication bus 301.

In the illustrated example of FIG. 3, the media communication bus 301 is a hardware conductive communication bus. In other examples disclosed herein, the media communication bus 301 is illustrative of wireless communication between the permission collector 302, the session identifier 304, and/or the session analyzer 306.

In the illustrated example of FIG. 3, the example permission collector 302 obtains and/or otherwise manages available permissions for the media manager 206. In examples disclosed herein, the permission collector 302 determines if the permission level of the meter 106 (e.g., determines if the desired media permission is granted). If the permission collector 302 determines the desired media permission is not granted, the permission collector 302 can facilitate the request for the desired media permission to access media data. In some examples disclosed herein, the permission collector 302 may transmit a request indication to the user of the user device 104 (e.g., transmit the request indication via the media communication bus 301 and further via the communication bus 201 of FIG. 2) to grant the desired media permission. In such examples, the user of the user device 104 is prompted to provide permission to the permission collector 302 to access data and/or metrics from the notification API (e.g., Android™ NotificationListenerService). In examples disclosed herein, the permission obtained to access data and/or metrics from the notification API may be the same permission to access data and/or metrics from the media API (e.g., Android™ MediaService). Additionally or alternatively, if an additional permission to access data and/or metrics in the user device, the permission collector 302 can facilitate the request and reception of such additional permission (e.g., additional permission to access alternative APIs, the media API, etc.).

In the illustrated example of FIG. 3, the example session identifier 304 listens to the notification API (e.g., Android™ NotificationListener) to determine notifications that occur. Example notifications observable by the session identifier 304 that originate from the notification API in the user device 104 include any calls from the user device 104 when a new notification is posted, removed, or their ranking is changed. For example, if a video is being played on the user device 104, the notification API generates a notification event stating the change, such notification event is observable by the media manager 206 of FIG. 2, and, more particularly, the session identifier 304. In examples disclosed herein, the session identifier 304 listens to the media API (e.g., Andorid™ MediaService) in parallel with the notification API (e.g., Android™ NotificationListener) to obtain media data and/or metrics corresponding to the observance of a notification. For example, is a video is being played on the user device 104, the session identifier 304 listens and/or otherwise observes the corresponding notification and similarly listens and/or otherwise observes for the occurrence of respective media data and/or metrics. Example media data and/or metrics include an associated MediaSession, an associated ActiveSession, etc.

In the example illustrated in FIG. 3, the session analyzer 306 analyzes and/or otherwise interprets the observed notifications from the session identifier 304. In response to a media data and/or metrics associated with the observed notification being available, the example session analyzer 306 determines if the media data and/or metrics includes an active media session (e.g., ActiveSession). If an active media session (e.g., ActiveSession) is available, the session analyzer 306 obtains a list media track functions (e.g., mediaController) and/or associated active media session data. The session analyzer 306 extracts the relevant metadata and/or list of media track functions (e.g., mediaController functions) associated with the media data and/or metrics. For example, after the session identifier 304 identifies a notification from the notification API (e.g., Android™ NotificationListenerService) and whether the notification includes relevant media data and/or metrics (e.g., MediaSession), the session analyzer 306 determines if the media data and/or metrics (e.g., MediaSession) is active media data and/or metrics (e.g., ActiveSession). In such examples, the session analyzer 306 extracts a relevant list of media track functions (e.g., mediaController functions) and corresponding metadata (e.g., title, application name, etc.). As such, the session analyzer 306 creates a package of media session data using the extracted data and/or metrics, the packaged media session data for use by the meter 106.

Additionally or alternatively, if an active media session (e.g., ActiveSession) is not available, the session analyzer 306 obtains the applicable media session playback data available from the media data and/or metrics (e.g., MediaSession). The session analyzer 306 extracts the applicable media session playback data associated with the media data and/or metrics (e.g., MediaSession). For example, after the session identifier 304 identifies a notification from the notification API (e.g., Android™ NotificationListenerService) and whether the notification includes relevant media data and/or metrics (e.g., MediaSession), the session analyzer 306 determines if the media data and/or metrics (e.g., MediaSession) is active media data and/or metrics (e.g., ActiveSession). In such examples, the session analyzer 306 extracts applicable media session playback data. In such examples, since active media data and/or metrics are not available, the session analyzer 306 generates an indication to request audio data and/or metrics. As such, the session analyzer 306 creates a package of available media session data using the extracted data and/or metrics, the available packaged media session data for use by the meter 106.

While an example manner of implementing the meter 106 of FIG. 1 is illustrated in FIGS. 2 and 3, one or more of the elements, processes and/or devices illustrated in FIGS. 2 and 3 may be combined, divided, re-arranged, omitted, eliminated and/or implemented in any other way. Further, the example audio manager 202, the example media manager 206, the example detector 210, the example data manager 214, the example permission collector 302, the example session identifier 304, and the example session analyzer 306 and/or, more generally, the example meter 106 of FIG. 1 may be implemented by hardware, software, firmware and/or any combination of hardware, software and/or firmware. Thus, for example, any of the example audio manager 202, the example media manager 206, the example detector 210, the example data manager 214, the example permission collector 302, the example session identifier 304, and the example session analyzer 306 and/or, more generally, the example meter 106 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio manager 202, the example media manager 206, the example detector 210, the example data manager 214, the example permission collector 302, the example session identifier 304, and the example session analyzer 306 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter 106 of FIG. 1 may include one or more elements, processes and/or devices in addition to, or instead of, those illustrated in FIGS. 2 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the meter 106 of FIG. 1 is shown in FIGS. 2 and 3. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 4-6, many other methods of implementing the example meter 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
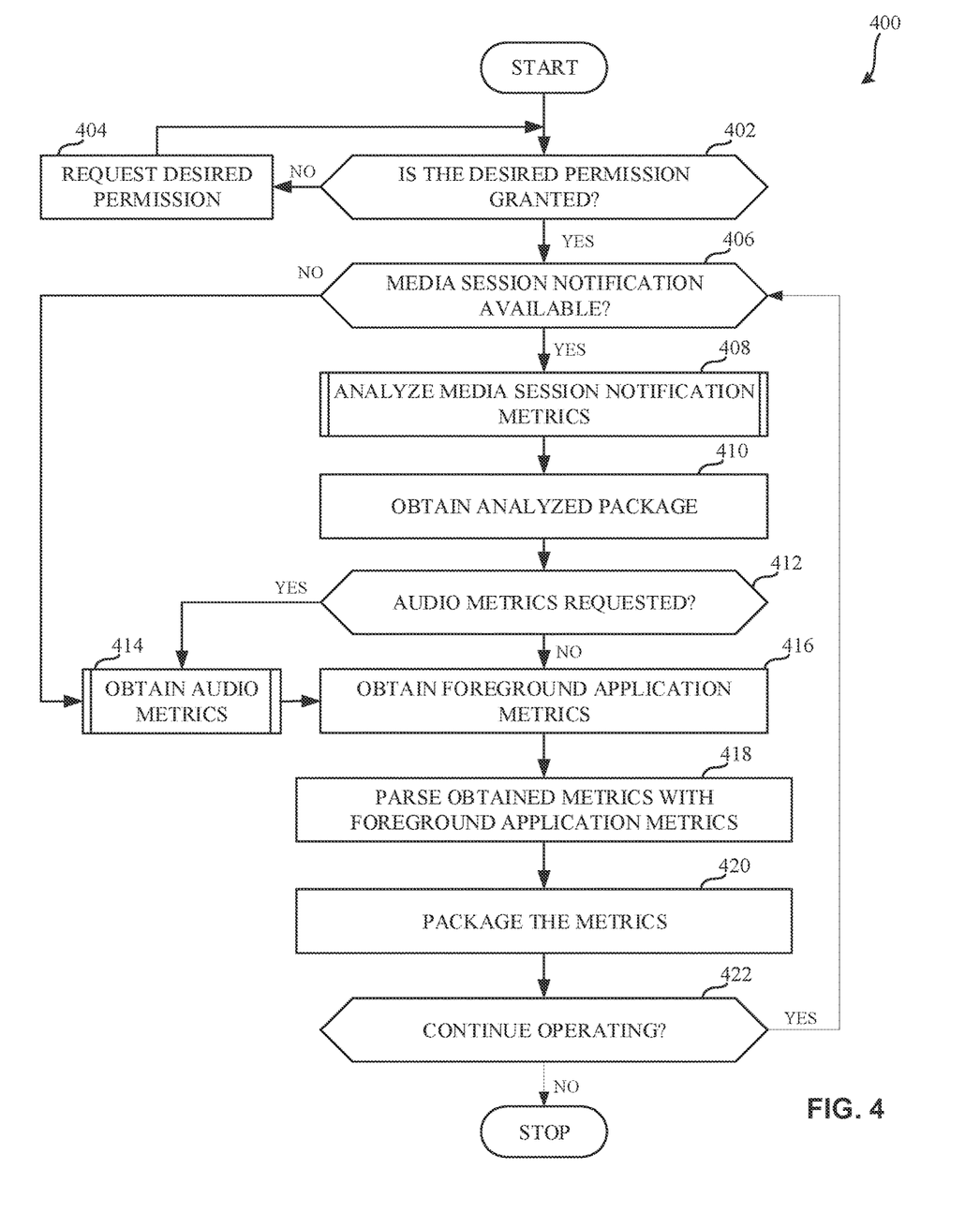
FIG. 4 is a flowchart representative of machine readable instructions which may be executed to implement meter of FIG. 1 to obtain metrics associated with native application programming interfaces.

FIG. 4 is a flowchart 400 representative of machine readable instructions which may be executed to implement meter 106 of FIG. 1 to obtain metrics associated with native application programming interfaces. Illustrated in FIG. 4, the permission collector 302 of the media manager 206 determines if the desired permission is granted (block 402). If the desired permission is not granted, the permission collector 302 of the media manager 206 requests the desired permission (block 404). In examples disclosed herein, the desired permission provides access to a notification API (e.g., Android™ NotificationListenerService).

If the desired permission is granted, the example session identifier 304 of the media manager 206 determines if a media session notification is available (block 406). If a media session notification is not available, then control is directed to the audio manager 202 of the meter 106 to obtain audio metrics (block 414). Example control executed by the audio manager 202 of the meter 106 to obtain audio metrics is explained in further detail below. Alternatively, if a media session notification is available, the session analyzer 306 of the media manager 206 analyzes the media session notification metrics (block 408). Example control executed by the session analyzer 306 to analyze the media session notification metrics is explained in further detail below.

In response, the session analyzer 306 obtains the analyzed package (block 410). In examples disclosed herein, the analyzed package obtained may include general media session playback data and/or metadata related to the media session notification. Additionally, in response to the analyzed package obtained, the session analyzer 306 determines whether audio metrics are requested (block 412). If audio metrics are requested (e.g., the obtained analyzed package does not obtain metadata), control returns to the audio manager 202 to execute the function of block 414.

In response to either obtaining audio metrics (block 414) or determining audio metrics are not requested (e.g., control response negative to executing the function of block 412), then the detector 210 of the meter 106 obtains foreground application metrics (block 416). The data manager 214 of the meter 106 parses the obtained metrics (e.g., the media session notification metrics and/or the audio metrics) with obtained foreground application metrics (e.g., the obtained foreground application metrics from block 416) (block 418). In response to parsing the abovementioned data, the data manager 214 packages the corresponding metrics (block 420). In examples disclosed herein, the packaged metrics from block 420 include relevant data relating to the media session notification identified in block 406.

In examples disclosed herein, the meter 106 and, thus, the audio manager 202, the media manager 206, the detector 210, and/or the data manager 214 determine whether to continue operating (block 422). Examples in which the meter 106 determines to cease operation include loss of power, loss of general permission (e.g., the permission to operate the meter 106 is lost), failure to operate, etc. In examples in which the meter 106 determines to continue operating, control returns to block 406 for the session identifier 304 of the media manger 206 to determine if a media session notification is available (block 406).

Figure 5:
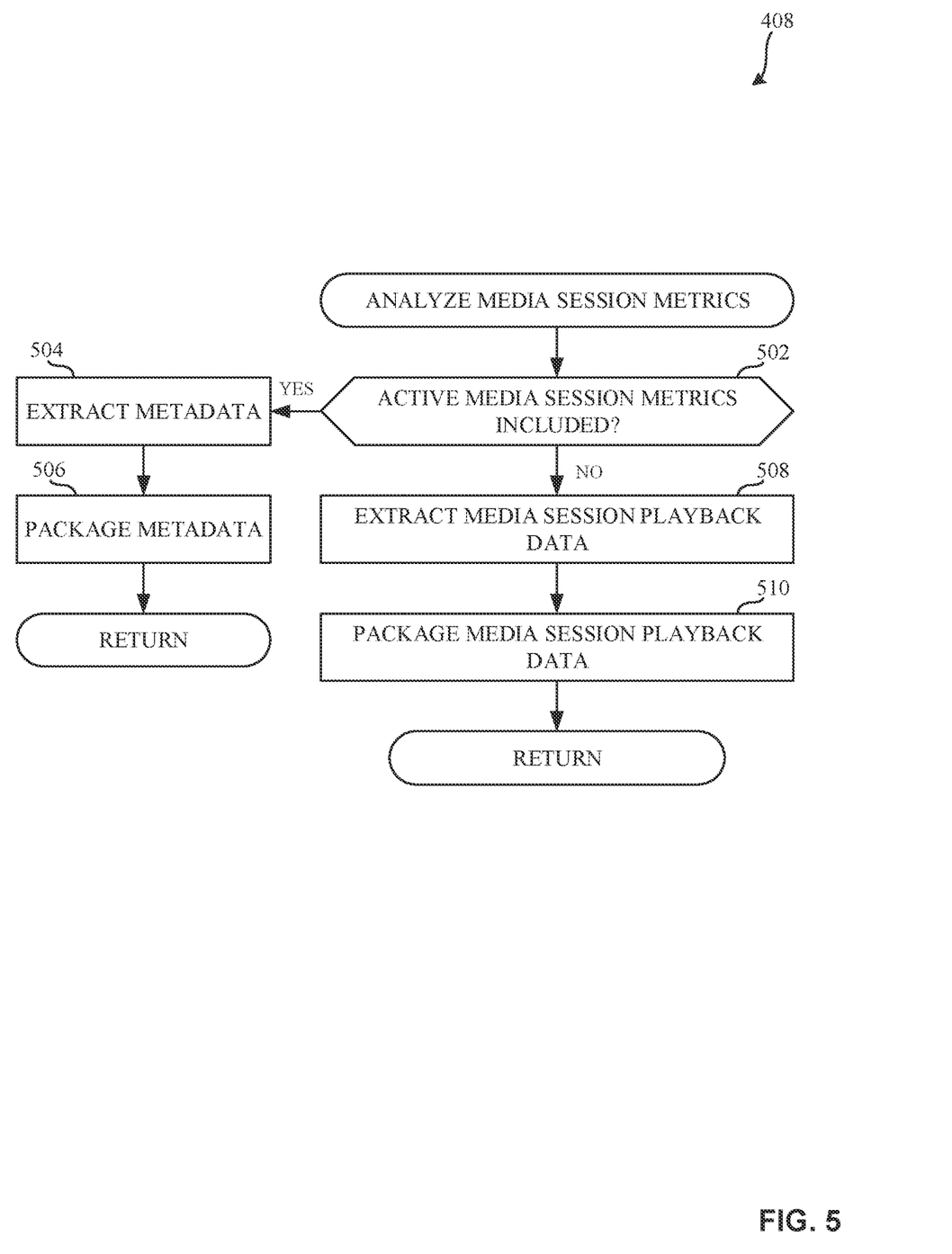
FIG. 5 is a flowchart representative of machine readable instructions which may be executed to implement the media manager of FIG. 2 to analyze media session notification metrics, as described above in conjunction with block 408 of FIG. 4.

FIG. 5 is a flowchart representative of machine readable instructions which may be executed to implement the media manager 206 of FIG. 2 to analyze media session notification metrics, as described above in conjunction with block 408 of FIG. 4. The media manger 206 determines if active media session metrics are included in the media session notification (block 502). If active media session metrics are included, the media manger 206 extracts the metadata associated with the media session notification (block 504). In addition, the media manager 206 packages the metadata (block 506).

If active media session metrics are not included, the media manger 206 extracts media session playback data (block 508). In examples disclosed herein, the media session playback data includes relevant media session information such as play time and/or stop time. The media manager 206 packages the media session playback data (block 510).

Figure 6:
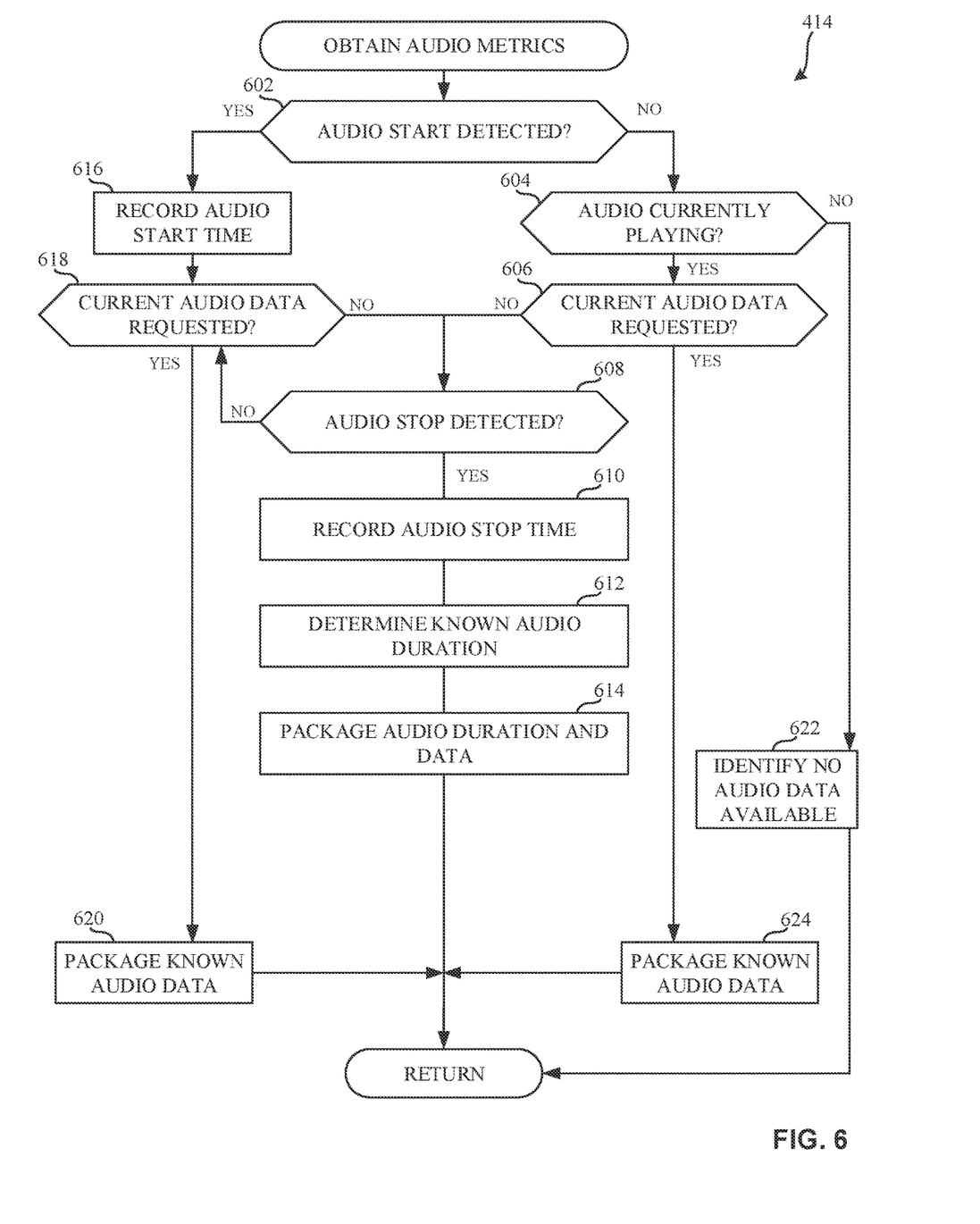
FIG. 6 is a flowchart representative of machine readable instructions which may be executed to implement the audio manager of FIG. 2 to obtain audio metrics, as described above in conjunction with block 414 of FIG. 4.

FIG. 6 is a flowchart representative of machine readable instructions which may be executed to implement the audio manager 202 of FIG. 2 to obtain audio metrics, as described above in conjunction with block 414 of FIG. 4. The audio manager 202 determines if an audio start is detected (block 602). If an audio start is not detected, then the audio manger 202 determines if audio is currently being played (block 604). In response, if the audio manager 202 determines audio is not currently being played, the audio manager 202 identifies that no audio data is available (block 622).

Alternatively, in response to the control executed in block 604, if it is determined that audio data is currently playing, the audio manager 202 determines if current audio is requested (block 606). In executing the control of block 606, if the audio manager 202 determines the current audio data is requested, the audio manager 202 packages the known audio data (e.g., the known duration of audio playing) (block 624). If the audio manager 202 determines the current audio data is not requested, the audio manager 202 determines if an audio stop is detected (block 608).

Returning to the control executed by the audio manger 202 in block 602, if an audio start is detected, then the audio manager 202 records the audio start time (block 616). In response, the audio manager 202 determines if the current audio data is requested (block 618). In examples disclosed herein, the control executed by the audio manager 202 in block 618 may be the same control executed by the audio manager in block 606. In executing the control of block 618, if the audio manager 202 determines the current audio data is requested, the audio manager 202 packages the known audio data (e.g., the known audio start time) (block 620). In examples disclosed herein, the control executed by the audio manager 202 in block 620 may be the same control executed by the audio manager in block 624. If the audio manager 202 determines the current audio data is not requested, the audio manager 202 determines if an audio stop is detected (block 608).

If an audio stop is not detected, the audio manager 202 checks to determine if the current audio data is requested (block 618). In other examples disclosed herein, in response to an audio stop not detected, the audio manger 202 may return to the control executed in block 606.

In examples disclosed herein in which an audio stop is detected, the audio manager 202 records the audio stop time (block 610). The audio manager 202 determines the known audio duration (e.g., the time elapsed between the audio start time and the audio stop time, or the time elapsed between detecting audio currently playing and the audio stop time) (block 612). In response, the audio manger 202 packages the audio duration and corresponding data (block 614).

Figure 7:
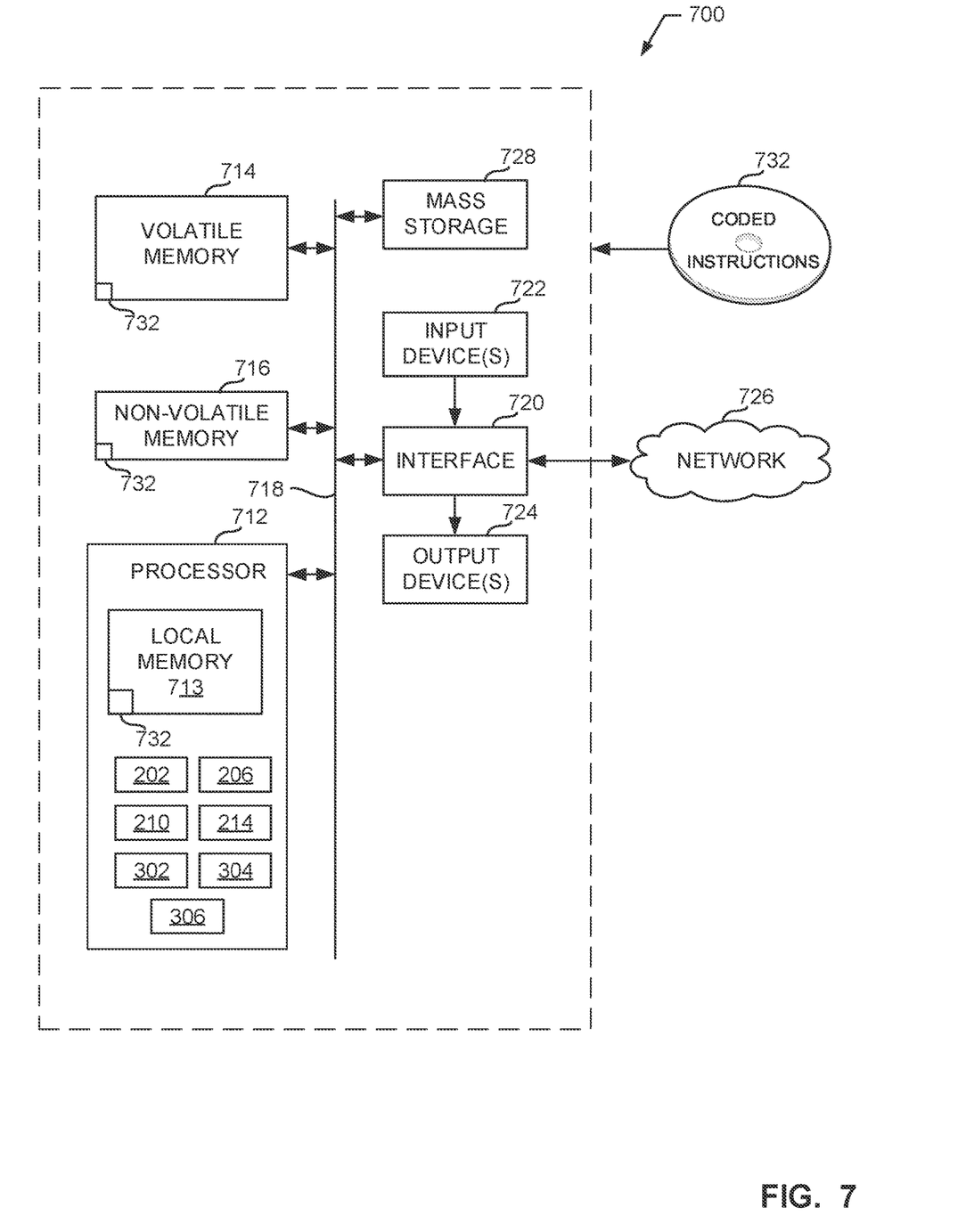
FIG. 7 is a block diagram of an example processor platform structured to execute the instructions of FIGS. 4-6 to implement the meter of FIG. 1.

FIG. 7 is a block diagram of an example processor platform 700 structured to execute the instructions of FIGS. 4-6 to implement the meter 106 of FIG. 1. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example audio manager 202, the example media manager 206, the example detector 210, the example data manager 214, the example permission collector 302, the example session identifier 304, and the example session analyzer 306.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 4-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that collect user media measurement data through native application programming interfaces. The disclosed methods, apparatus and articles of manufacture improve the efficiency of using a computing device by obtaining media metrics for streamed media on a user device. The disclosed methods, apparatus and article of manufacture utilize less processing power by parsing media metrics from a variety of native application programming interfaces to obtain reliable media metric data. As such, reliable media metric data can be obtained without having to perform redundant processing tasks. The disclosed methods, apparatus and article of manufacture utilize native APIs in a manner that allows for efficient collection of media metrics by combining the native API media metric data with foreground application data. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement meter associated with a media playback device, the audience measurement meter comprising:
    at least one processor; and
    memory having stored thereon computer readable instructions that, when executed by the at least one processor, cause the audience measurement meter to be configured to:
        make a first determination that a permission level of the audience measurement meter does not permit access to notifications of a first application programming interface (API), and, in response to making the first determination, requesting permission to access data of the first API;
        based on receiving access to notifications of the first API, make a second determination that a media session notification is not available based on an indication accessed via the first API;
        based on: (i) making the second determination, and (ii) receiving access to a second API different from the first API, obtain, via the second API, a current audio playback state of the media playback device;
        obtain a current application being executed in a foreground of the media playback device; and
        report indications of the audio playback state and the current application.

2. The audience measurement meter of claim 1, wherein the computer readable instructions further cause, when executed by the at least one processor, the audience measurement meter to be configured to:
    obtain foreground information, wherein the current application being executed is indicated by the foreground information;

identify a title of audio content being played back by the media playback device based on the foreground information; and report the title in association with the audio playback state and the current application.

3. The audience measurement meter of claim 1, wherein the computer readable instructions further cause, when executed by the at least one processor, the audience measurement meter to be configured to obtain, via the second API, an audio playback start time of audio content being played back by the media playback device.

4. The audience measurement meter of claim 3, wherein the computer readable instructions further cause, when executed by the at least one processor, the audience measurement meter to be configured to determine a duration of audio playback of the audio content based in part on the audio playback start time.

5. The audience measurement meter of claim 3, wherein the computer readable instructions further cause, when executed by the at least one processor, the audience measurement meter to be configured to:
    obtain, via the second API, an audio playback stop time of the audio content being played back by the media playback device; and
    determine a duration of audio playback of the audio content based in part on the audio playback start time and the audio playback stop time.

6. The audience measurement meter of claim 1, wherein the media playback device and the audience measurement meter are implemented in a single hardware device.

7. The audience measurement meter of claim 1, wherein the computer readable instructions further cause, when executed by the at least one processor, the audience measurement meter to be configured to:
    present, via a user interface, a prompt requesting permission to install the audience measurement meter;
    receive an indication of a command, from a user, indicating permission to install the audience measurement meter; and
    responsive to receiving the indication of the command, cause installation of the audience measurement meter to be carried out.

8. A non-transitory computer readable storage medium having stored thereon instructions that, when executed by a processor of a media playback device, cause performance of a set of operations comprising:
    making a first determination that a permission level of an on-device audience measurement meter does not permit access to notifications of a first application programming interface (API), and, in response to making the first determination, requesting permission to access data of the first API;
    based on receiving access to notifications of the first API, making a second determination that a media session notification is not available based on an indication accessed via the first API;
    based on: (i) making the second determination, and (ii) receiving access to a second API different from the first API, obtaining, via the second API, a current audio playback state of the media playback device;
    obtaining a current application being executed in a foreground of the media playback device; and
    reporting indications of the audio playback state and the current application.

9. The non-transitory computer readable storage medium of claim 8, wherein the operations further include:
    obtaining foreground information, wherein the current application being executed is indicated by the foreground information;
    identifying a title of audio content being played back by the media playback device based on the foreground information; and
    reporting the title in association with the audio playback state and the current application.

10. The non-transitory computer readable storage medium of claim 8, wherein the operations further include obtaining, via the second API, an audio playback start time of audio content being played back by the media playback device.

11. The non-transitory computer readable storage medium of claim 10, wherein the operations further include determining a duration of audio playback of the audio content based in part on the audio playback start time.

12. The non-transitory computer readable storage medium of claim 10, wherein the operations further include:
    obtaining, via the second API, an audio playback stop time of the audio content being played back by the media playback device; and
    determining a duration of audio playback of the audio content based in part on the audio playback start time and the audio playback stop time.

13. The non-transitory computer readable storage medium of claim 8, wherein the operations further include:
    presenting, via a user interface, a prompt requesting permission to install the on-device audience measurement meter;
    receiving an indication of a command, from a user, indicating permission to install the on-device audience measurement meter; and
    responsive to receiving the indication of the command, causing installation of the on-device audience measurement meter to be carried out.

14. A method comprising:
    making a first determination that a permission level of an audience measurement meter does not permit access to notifications of a first application programming interface (API), and, in response to making the first determination, requesting permission to access data of the first API;
    based on receiving access to notifications of the first API, making a second determination that a media session notification is not available based on an indication accessed via the first API;
    based on: (i) making the second determination, and (ii) receiving access to a second API different from the first API, obtaining, via the second API, a current audio playback state of a media playback device;
    obtaining a current application being executed in a foreground of the media playback device; and
    reporting indications of the audio playback state and the current application.

15. The method of claim 14, further including:
    obtaining foreground information, wherein the current application being executed is indicated by the foreground information;
    identifying a title of audio content being played back by the media playback device based on the foreground information; and
    reporting the title in association with the audio playback state and the current application.

16. The method of claim 14, further including:
    obtaining, via the second API, an audio playback start time of audio content being played back by the media playback device.

17. The method of claim 16, further including:
determining a duration of audio playback of the audio content based in part on the audio playback start time.

18. The method of claim 16, further including:
obtaining, via the second API, an audio playback stop time of the audio content being played back by the media playback device; and
determining a duration of audio playback of the audio content based in part on the audio playback start time and the audio playback stop time.

19. The method of claim 14, further including:
presenting, via a user interface, a prompt requesting permission to install the audience measurement meter;
receiving an indication of a command, from a user, indicating permission to install the audience measurement meter; and
responsive to receiving the indication of the command, causing installation of the audience measurement meter to be carried out.

20. The method of claim 14, further including packaging together the indications of the audio playback state and the current application.

* * * * *